US008546484B2

(12) United States Patent
Higuchi et al.

(10) Patent No.: US 8,546,484 B2
(45) Date of Patent: *Oct. 1, 2013

(54) UV-SHIELDING SILICONE COATING COMPOSITION AND COATED ARTICLE

(75) Inventors: Koichi Higuchi, Annaka (JP); Hisatoshi Komori, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 659 days.

This patent is subject to a terminal disclaimer.

(21) Appl. No.: 12/712,738

(22) Filed: Feb. 25, 2010

(65) Prior Publication Data

US 2010/0221557 A1   Sep. 2, 2010

(30) Foreign Application Priority Data

Mar. 2, 2009   (JP) ................................ 2009-047965

(51) Int. Cl.
  *C08F 220/12*   (2006.01)
  *C04B 41/49*    (2006.01)
  *C08K 9/00*     (2006.01)

(52) U.S. Cl.
  USPC ...... 524/858; 523/200; 428/447; 106/287.12; 106/287.14

(58) Field of Classification Search
  USPC ................. 428/446, 447; 252/589; 524/858; 106/287.12, 287.13, 287.14; 523/200
  See application file for complete search history.

(56) References Cited

U.S. PATENT DOCUMENTS

| | | | |
|---|---|---|---|
| 3,986,997 | A | 10/1976 | Clark |
| 4,122,233 | A | 10/1978 | Proskow |
| 4,159,206 | A | 6/1979 | Armbruster et al. |
| 4,390,660 | A | 6/1983 | Ashby |
| 4,555,559 | A | 11/1985 | Kimura et al. |
| 4,668,452 | A | 5/1987 | Watanabe et al. |
| 5,250,359 | A | 10/1993 | Funaki et al. |
| 5,391,795 | A | 2/1995 | Pickett |
| 6,214,416 | B1 | 4/2001 | Sakagami et al. |
| 6,855,768 | B2 | 2/2005 | Matsumura et al. |
| 7,157,146 | B2 | 1/2007 | Higuchi et al. |
| 7,560,164 | B2 | 7/2009 | Higuchi et al. |
| 2002/0051889 | A1* | 5/2002 | Kanamori et al. ............ 428/447 |
| 2005/0244659 | A1* | 11/2005 | Higuchi et al. ............... 428/447 |
| 2006/0167138 | A1 | 7/2006 | Ishii et al. |
| 2008/0096029 | A1 | 4/2008 | Higuchi et al. |
| 2008/0280149 | A1 | 11/2008 | Higuchi et al. |

FOREIGN PATENT DOCUMENTS

| | | |
|---|---|---|
| JP | 51-2736 | 1/1976 |
| JP | 53-130732 | 11/1978 |
| JP | 61-54800 | 11/1986 |
| JP | 61-56187 | 12/1986 |
| JP | 63-168470 | 7/1988 |
| JP | 3-14862 | 2/1991 |
| JP | 3-62177 | 9/1991 |
| JP | 4-106161 | 4/1992 |
| JP | 7-278525 | 10/1995 |
| JP | 8-59890 | 3/1996 |
| JP | 2783417 | 5/1998 |
| JP | 11-209695 | 8/1999 |
| JP | 11-278838 | 10/1999 |
| JP | 11-310755 | 11/1999 |
| JP | 2000-204301 | 7/2000 |
| JP | 3102696 | 8/2000 |
| JP | 2001-47574 | 2/2001 |
| JP | 2002-60687 | 2/2002 |
| JP | 2002-87817 | 3/2002 |
| JP | 3347097 | 9/2002 |
| JP | 3509749 | 1/2004 |
| JP | 2004-59421 | 2/2004 |
| JP | 2004-238418 | 8/2004 |
| JP | 2004-292282 | 10/2004 |
| JP | 2005-314616 | 11/2005 |
| JP | 3841141 | 8/2006 |
| JP | 4041968 | 11/2007 |
| JP | 2008-120986 | 5/2008 |
| JP | 2008-274177 | 11/2008 |
| JP | 2008-280202 | 11/2008 |
| JP | 2008-280465 | 11/2008 |
| JP | 2008-297396 | 12/2008 |

OTHER PUBLICATIONS

Machine Translation of JP 2008-280202 (2008).*
Machine Translation of JP 2003-292818 (2003).*
Japanese Office Action issued Jul. 20, 2011, in Patent Application No. 2009-047965.
John-Anthony MacPhee et al., "Steric Effects. 4 Multiparameter Correlation Models. Geometrical and Proximity Site Effects for Carboxylic Acid Esterification and Related Reactions", J. Org. Chem., vol. 45, No. 6, 1980, 2 pages.
David P. White et al., "Computational Measurement of Steric Effects: the Size of Organic Substituents Computed by Ligand Repulsive Energies", J. Org. Chem., vol. 64, No. 21, 1999, 5 pages.
Extended European Search Report issued Dec. 2, 2010 in EP 10 25 0370.

* cited by examiner

*Primary Examiner* — Hannah Pak

(74) *Attorney, Agent, or Firm* — Oblon, Spivak, McClelland, Maier & Neustadt, L.L.P.

(57) ABSTRACT

A UV-shielding silicone coating composition comprises (A) a dispersion in a dispersing medium of composite zinc oxide nanoparticles which are obtained by coating zinc oxide nanoparticles with an oxide or hydroxide of Al, Si, Zr or Sn, the dispersion having a photocatalytic degradability of up to 25%, (B) a silicone resin, (C) a curing catalyst, and (D) a solvent, the solids content of composite zinc oxide nanoparticle dispersion (A) being 1 to 50% by weight based on silicone resin (B). The composition is transparent to visible light, mar resistant, UV-shielding, weatherable, and durable.

18 Claims, 1 Drawing Sheet

UV-SHIELDING SILICONE COATING COMPOSITION AND COATED ARTICLE

CROSS-REFERENCE TO RELATED APPLICATION

This non-provisional application claims priority under 35U.S.C. §119(a) on Patent Application No. 2009-047965 filed in Japan on Mar. 2, 2009, the entire contents of which are hereby incorporated by reference.

TECHNICAL FIELD

This invention relates to a silicone coating composition and a coated article. More particularly, it relates to a silicone coating composition which is coated onto an organic resin substrate and heat cured to form a film having mar resistance, visible light transparency, UV-shielding property, and long-term weatherability, and a coated substrate having a cured film of the composition.

BACKGROUND ART

In the prior art, substrates of organic resins or plastics are surface coated with various coating compositions to form surface protective films for the purpose of imparting high hardness and mar resistance. For instance, compositions comprising hydrolyzates or partial hydrolyzates of hydrolyzable organosilanes and optionally, colloidal silica are known.

For instance, JP-A S51-2736, JP-A S53-130732 and JP-A S63-168470 disclose coating compositions comprising an organoalkoxysilane or hydrolyzate and/or partial hydrolytic condensate thereof, and colloidal silica, wherein the alkoxy group is converted into silanol in the presence of excess water. These coating compositions form coatings which have a high hardness, good weatherability, and an ability to protect the underlying substrates, but lack toughness. In particular, coatings of at least 10 μm thick tend to develop cracks in such durations as heat curing, removal from the heat curing furnace, outdoor service, and abrupt temperature changes. Although a buffered basic catalyst is used as the curing catalyst from the aspect of storage stability, these coating compositions suffer from a stability problem. The hydrolyzate/condensate of alkoxysilane is composed mainly of relatively low molecular weight compounds, silanol contained in these low molecular weight compounds has a very high reactivity, and the content of silanol is very high. Then condensation reaction of silanol gradually occurs even at room temperature, and the low molecular weight compounds build up their molecular weight with the lapse of time. Then coatings of aged compositions have a low hardness. Sometimes the compositions gel and become unusable as the coating agent. To solve these problems, JP-A 2005-314616 proposes to use a certain basic compound as the curing catalyst to formulate a composition which has shelf stability in the liquid form and exhibits crack resistance, hardness and mar resistance in the cured film state.

However, several problems must be solved before coating films can withstand sunlight and weather over a long time. The coating layers lack an ability to cut UV, allowing a phenomenon to develop that a resin substrate, a primer layer for imparting substrate adhesion or an interface therebetween can be degraded or discolored by UV exposure. Several techniques are proposed to prevent such a phenomenon, including addition of UV absorber to the primer layer, and incorporation via chemical bonds of UV absorptive organic substituent groups into the organic resin of which the primer layer is formed. The UV absorptive organic substituent groups and UV absorbers refer to benzophenone, benzotriazole, triazine and similar substituent groups, and organic compounds containing the same. See JP-A H04-106161, JP 3102696, JP-A 2001-47574, and JP 3841141.

The above technique for cutting off UV is by incorporating an organic UV absorber into a primer layer. Since the primer layer in itself has the main purpose of improving the adhesion between the underlying substrate and a silicone layer, an extra amount of UV absorber loaded therein gives rise to problems such as losses of adhesion and transparency. It is demonstrated in a long-term outdoor exposure test and accelerated weathering test that the UV cut by the primer layer alone is insufficient for preventing degradation and discoloration of organic resin substrates.

One approach taken for compensating for such drawbacks was to add organic UV absorbers to silicone layers as well. However, simply adding UV absorbers to coating compositions results in a less durable coating. That is, the coating fails to sustain the desired UV absorbing property due to bleeding and drainage of UV absorber from the surface during long-term weather exposure. Then organic UV absorbers were developed which are silyl-modified so as to be chemically bondable with siloxane compounds, the main component of the coating layer. See JP-B S61-54800, JP-B H03-14862, JP-B H03-62177, and JP-A H07-278525. This measure improves retentivity since the UV absorber is strongly bound to the siloxane matrix. On the other hand, these coating layers become substantially poor in mar resistance that is essentially desired, or develop noticeable microcracks due to a lowering of flexibility. As discussed above, the organic UV absorbers have the essential drawback that the hardness of silicone film becomes lower as the amount of UV absorber added is increased to enhance weather resistance.

In another attempt, metal oxide nanoparticles having UV shielding property are added to coating compositions so that the compositions may maintain hardness and mar resistance. Known examples are titanium oxide nanoparticles of anatase type (JP-A 2004-238418) and titanium oxide nanoparticles of rutile type (JP 2783417, JP-A H11-310755, JP-A 2000-204301). These coating compositions form UV-shielding coatings which maintain visible light transmitting and mar resistant properties. However, titanium oxide nanoparticles have a photocatalytic activity which cannot be fully suppressed even when they are surface coated with silicon compounds. Additionally, the coatings have insufficient weather resistance in that cracks develop in a relatively early stage in a long-term accelerated weathering test.

It is also known to use zinc oxide nanoparticles as the metal oxide nanoparticles having UV shielding property (see JP-A H11-209695, JP 3347097, and JP-A 2002-60687). In general, the zinc oxide nanoparticles have somewhat poorer UV shielding property than the titanium oxide nanoparticles and accordingly lower photocatalytic activity. However, on account of residual photocatalytic activity, a coating loaded with zinc oxide nanoparticles can not avoid a phenomenon that the coating develops cracks or peels in a weathering test.

JP 3509749 and JP-A 2002-87817 disclose an attempt to suppress photocatalytic activity by coating surfaces of zinc oxide nanoparticles with another oxide. A coating loaded with surface-coated zinc oxide nanoparticles has a longer lifetime in a weathering test than bare zinc oxide nanoparticles. However, the coating is still insufficient as outdoor UV shielding members partly because cracks develop in a long-term weathering test.

In general, visible light transparency is one of important properties of coating compositions for forming weather resistant surface protective coatings. If metal oxide nanoparticles are used as the UV shielding agent, visible light transparency is substantially impaired depending on an average particle size and a tendency to agglomerate. JP-A H11-278838 discloses that when zinc oxide nanoparticles are prepared by a specific method, a dispersion thereof has a smaller particle size and is unsusceptible to agglomeration. A coating composition having this zinc oxide nanoparticle dispersion compounded therein would be highly transparent to visible light although this is not described in Examples.

As discussed above, a number of attempts have been made to improve the weather resistance, mar resistance and other properties of coating compositions. However, there is not available a coating composition whose cured film exhibits mar resistance, UV shielding property, and sufficient weather resistance and durability to withstand prolonged outdoor exposure while maintaining visible light transparency.

CITATION LIST

Patent Document 1: JP-A S51-2736
Patent Document 2: JP-A S53-130732
Patent Document 3: JP-A S63-168470
Patent Document 4: JP-A 2005-314616
Patent Document 5: JP-A H04-106161
Patent Document 6: JP 3102696
Patent Document 7: JP-A 2001-47574
Patent Document 8: JP 3841141
Patent Document 9: JP-B S61-54800
Patent Document 10: JP-B H03-14862
Patent Document 11: JP-B H03-62177
Patent Document 12: JP-A H07-278525
Patent Document 13: JP-A 2004-238418
Patent Document 14: JP 2783417
Patent Document 15: JP-A H11-310755
Patent Document 16: JP-A 2000-204301
Patent Document 17: JP-A H11-209695
Patent Document 18: JP 3347097
Patent Document 19: JP-A 2002-60687
Patent Document 20: JP 3509749
Patent Document 21: JP-A 2002-87817
Patent Document 22: JP-A H11-278838

DISCLOSURE OF INVENTION

An object of the invention is to provide a coating composition whose cured film maintains visible light transparency, has mar resistance and UV shielding property, and also has sufficient weather resistance and durability to withstand prolonged outdoor exposure. Another object is to provide an article coated with the composition.

The invention pertains to a coating composition comprising a silicone resin and zinc oxide nanoparticles as a UV-shielding agent. The inventors have found that when a dispersion of composite zinc oxide nanoparticles obtained by coating zinc oxide nanoparticles with a specific coating so as to suppress photocatalytic activity to a substantial extent is compounded in the coating composition, the cured film exhibits very high mar resistance and UV shielding property, maintains visible light transparency, and offers weather resistance and crack resistance against prolonged outdoor exposure which could not be achieved in the prior art.

In one aspect, the invention provides a UV-shielding silicone coating composition comprising (A) a dispersion in a dispersing medium of composite zinc oxide nanoparticles which are obtained by coating surfaces of zinc oxide nanoparticles with at least one member selected from the group consisting of oxides and hydroxides of Al, Si, Zr and Sn, said dispersion having a photocatalytic degradability of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to the following formula:

$$PD(\%)=[(A0-A)/A0]\times 100$$

wherein A0 is the initial absorbance and A is the absorbance after the black light irradiation, (B) a silicone resin obtained from (co)hydrolytic condensation of at least one member selected from alkoxysilanes and partial hydrolytic condensates thereof, said alkoxysilane having the general formula (1):

$$(R^1)_m(R^2)_n Si(OR^3)_{4-m-n} \tag{1}$$

wherein $R^1$ and $R^2$ are each independently hydrogen or a substituted or unsubstituted monovalent hydrocarbon group, and $R^1$ and $R^2$ may bond together, $R^3$ is a $C_1$-$C_3$ alkyl group, and m and n are independently 0 or 1 and m+n is 0, 1 or 2, (C) a curing catalyst, and
(D) a solvent, the solids content of composite zinc oxide nanoparticle dispersion (A) being 1 to 50% by weight based on the solids content of silicone resin (B).

In a preferred embodiment, the composite zinc oxide nanoparticles in dispersion (A) have been further surface-treated with at least one member selected from hydrolyzable silanes and partial hydrolytic condensates thereof, said hydrolyzable silane having the general formula (2):

$$(R^4)_x(R^5)_y Si(X)_{4-x-y} \tag{2}$$

wherein $R^4$ and $R^5$ are each independently hydrogen or a substituted or unsubstituted monovalent hydrocarbon group, X is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3.

In a preferred embodiment, the zinc oxide nanoparticles from which the composite zinc oxide nanoparticles in dispersion (A) are derived have been prepared by heating and vaporizing a zinc source in direct current arc plasma, oxidizing the zinc vapor, and cooling. Typically, the composite zinc oxide nanoparticles have an average particle size (volume average particle size $D_{50}$) of 10 to 200 nm.

In a preferred embodiment, the dispersing medium is selected from water, alcohols, esters, ketones, glycol ethers, aromatic hydrocarbons, and saturated hydrocarbons, and mixtures thereof.

In a preferred embodiment, a silicone resin which is obtained from (co)hydrolytic condensation of at least one member selected from alkoxysilanes having formula (1) and partial hydrolytic condensates thereof in the presence of component (A) is used as components (A) and (B).

In a preferred embodiment, component (C) is present in an effective amount to cure the silicone resin (B), and component (D) is present in such an amount that the composition has a solids concentration of 1 to 30% by weight.

The composition may further comprise (E) colloidal silica, preferably in an amount of 5 to 100 parts by weight per 100 parts by weight as solids of the silicone resin (B). The composition may further comprise a UV absorber and/or UV stabilizer.

The silicone coating composition is weather resistant such that provided that the silicone coating composition is coated on the surface of a vinyl copolymer layer on an organic resin substrate and cured to form a film, the film does not develop cracks in a weathering test using a Super-UV tester over 500 hours.

In another aspect, the invention provides a coated article comprising a substrate and a cured film of the UV-shielding silicone coating composition disposed on at least one surface of the substrate directly or via at least one layer.

The substrate is typically an organic resin substrate. A preferred embodiment is a coated article comprising an organic resin substrate, a primer film on at least one surface of the substrate, the primer film comprising a vinyl copolymer having an organic UV absorbing group and an alkoxysilyl group on side chains, and a cured film of the UV-shielding silicone coating composition on the surface of the primer film. A more preferred embodiment is a coated article comprising an organic resin substrate, a primer film on at least one surface of the substrate, the primer film comprising a vinyl copolymer having an organic UV absorbing group and an alkoxysilyl group on side chains and a silica sol, and a cured film of the UV-shielding silicone coating composition on the surface of the primer film.

ADVANTAGEOUS EFFECTS OF INVENTION

A cured film of the coating composition maintains visible light transparency, exhibits mar resistance and UV shielding property, and further possesses sufficient weather resistance and durability to withstand long-term outdoor exposure. A coated article has the same advantages.

DESCRIPTION OF EMBODIMENTS

The singular forms "a," "an" and "the" include plural referents unless the context clearly dictates otherwise. The notation (Cn—Cm) means a group containing from n to m carbon atoms per group. UV refers to the ultraviolet region of the electromagnetic spectrum. Mw refers to a weight average molecular weight as measured by gel permeation chromatography (GPC) versus polystyrene standards. As used herein, the term "film" is interchangeable with "coating" or "layer".

Components of the silicone coating composition are described in detail.

Component A

Component (A) is a dispersion in a dispersing medium of composite zinc oxide nanoparticles obtained by coating surfaces of zinc oxide nanoparticles with at least one member selected from the group consisting of oxides and hydroxides of Al, Si, Zr and Sn. The composite zinc oxide nanoparticle dispersion should have a photocatalytic degradability of up to 25%. As used herein, the photocatalytic degradability (PD) is determined by adding the composite zinc oxide nanoparticle dispersion to a methylene blue solution, irradiating black light to the methylene blue solution for 12 hours, measuring the absorbance of the solution at 653 nm before and after the black light irradiation, and calculating a change of absorbance before and after the black light irradiation according to the following formula:

$$PD(\%) = [(A0-A)/A0] \times 100$$

wherein A0 is the initial absorbance and A is the absorbance after the black light irradiation.

More preferably, the composite zinc oxide nanoparticles are obtained by heating a zinc source in a direct current arc plasma for vaporization, oxidizing the zinc vapor, cooling, thus forming zinc oxide nanoparticles, and coating surfaces of the zinc oxide nanoparticles with at least one member selected from oxides and hydroxides of Al, Si, Zr and Sn. The resulting composite zinc oxide nanoparticles are then dispersed in a dispersing medium to yield a composite zinc oxide nanoparticle dispersion.

The (surface-coated) composite zinc oxide nanoparticles are characterized by a fully low photocatalytic activity. In general, zinc oxide nanoparticles have a UV shielding function and a photocatalyst function at the same time. If such zinc oxide nanoparticles are used as a UV shielding agent in a hard coat composition, their photocatalyst function can degrade the binder so that the hard coat may develop cracks. By contrast, the (surface-coated) composite zinc oxide nanoparticles have a very low photocatalytic activity, minimizing crack formation. Since the (surface-coated) composite zinc oxide nanoparticles are prepared by coating surfaces of zinc oxide nanoparticles with an oxide or hydroxide, typically silica, and are preferably further surface treated with a hydrolyzable silane, their photocatalytic activity is minimized.

The photocatalytic activity may be evaluated by measuring a change of absorbance by photodegradation of methylene blue. Specifically, 0.15 g calculated as composite zinc oxide nanoparticle solids of the (surface-coated) composite zinc oxide nanoparticle dispersion is added to 20 g of a methylene blue solution in water/methanol (1:1 weight ratio) having a methylene blue concentration of 0.01 mmol/L. The solution is stirred in the dark for 30 minutes, and then irradiated with black light at a power of 15 W for 12 hours. Thereafter, the solution was centrifuged at 3,000 rpm for 15 minutes to collect the supernatant, and the absorbance of methylene blue at 653 nm is measured by a UV/visible spectrophotometer. A photocatalytic degradability (PD) is computed from the absorbances before and after the black light irradiation according to the following formula:

$$PD(\%) = [(A0-A)/A0] \times 100$$

wherein A0 is the initial absorbance and A is the absorbance after the black light irradiation. The (surface-coated) composite oxide nanoparticles should have a photocatalytic degradability (PD) of up to 25%, and preferably up to 23%.

The composite zinc oxide nanoparticles having a photocatalytic degradability of up to 25% may be obtained by selecting a nanoparticulate composite zinc oxide having a low photocatalytic activity or coating surfaces of composite zinc oxide nanoparticles with the surface treating agent.

Zinc oxide nanoparticles may be prepared by several plasma methods including DC arc plasma, plasma jet, and high-frequency plasma. The DC arc plasma method is most preferred because of a propensity to form composite zinc oxide nanoparticles having a low photocatalytic activity and high productivity. Since the zinc oxide nanoparticles prepared by the DC arc plasma method have very strong absorptivity probably because of good surface crystallinity so that they strongly adsorb amino, imino, quaternary ammonium base or other functional groups in the dispersant, the particles are uniformly dispersed and they do not adsorb each other. As a result, a coating composition having compounded therein the zinc oxide nanoparticles prepared by the DC arc plasma method may form a coating which is highly transparent and free of turbidity.

The DC arc plasma method which is preferably used in preparing zinc oxide nanoparticles involves the steps of providing a consumable anode made of a zinc source such as metallic zinc, producing a plasma flame of argon gas from a cathode, heating the zinc source for evaporation, and oxidizing the zinc vapor, followed by cooling. By this method, zinc oxide nanoparticles are effectively prepared, which have an average particle size (volume average particle size $D_{50}$) in the range of 10 to 200 nm as measured by the light scattering method.

For component (A), composite zinc oxide nanoparticles are prepared by coating surfaces of zinc oxide nanoparticles with at least one member selected from oxides and hydroxides of Al, Si, Zr and Sn. Examples of the composite zinc oxide nanoparticles include those in which zinc oxide nanoparticles are provided with an oxide coating by using an alkoxide of Al, Si, Zr or Sn and effecting hydrolysis, and those which are obtained by adding a sodium silicate aqueous solution to zinc oxide nanoparticles, neutralizing the solution for causing an oxide or hydroxide to precipitate on particle surfaces, and optionally further heating the precipitated oxide or hydroxide to enhance crystallinity.

In the composite zinc oxide nanoparticles, the coating weight of oxide and/or hydroxide is preferably 0.1 to 20% by weight, and more preferably 1 to 10% by weight. If the coating weight is less than 0.1 wt %, then such a coating is ineffective for controlling photocatalytic activity and difficult to improve chemical resistance. If the coating weight is more than 20 wt %, then the amount of the core zinc oxide is less than 80 wt %, sometimes leading to a loss of UV shielding efficiency per unit weight.

In a preferred embodiment, the composite zinc oxide nanoparticles are further surface treated with at least one member selected from hydrolyzable silanes and partially hydrolytic condensates thereof, to produce surface-coated composite oxide nanoparticles. The hydrolyzable silane has the following general formula (2):

$$(R^4)_x(R^5)_y Si(X)_{4-x-y} \quad (2)$$

wherein $R^4$ and $R^5$ are each independently hydrogen or a substituted or unsubstituted monovalent hydrocarbon group, X is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3.

Specifically, surface treatment is carried out by adding a hydrolyzable silane of formula (2) to the composite zinc oxide nanoparticles, hydrolyzing the silane in the presence of water and a basic organic compound, and effecting silanol condensation reaction of the hydrolyzate. This is the so-called sol-gel process.

In formula (2), $R^4$ and $R^5$ are each independently selected from hydrogen and substituted or unsubstituted monovalent hydrocarbon groups. The monovalent hydrocarbon groups are preferably those of 1 to 12 carbon atoms, more preferably 1 to 8 carbon atoms, for example, alkyl, alkenyl, aryl and aralkyl groups. In the case of substituted monovalent hydrocarbon groups, exemplary substituents include halogen atoms such as chlorine and fluorine, amino, epoxy, glycidyloxy, mercapto, (meth)acryloyloxy, and carboxyl. X is a halogen atom, $C_1$-$C_3$ alkoxy group, $C_1$-$C_3$ acyloxy group or isocyanate group. The subscript x is 0 or 1, y is 0, 1 or 2, and x+y is 0, 1, 2 or 3.

Illustrative, non-limiting examples of the hydrolyzable silane include tetrafunctional silanes such as tetramethoxysilane, tetraethoxysilane, tetra(n-propoxy)silane, tetraisopropoxysilane, and tetra(n-butoxy)silane;

trifunctional silanes such as methyltrimethoxysilane, methyltriethoxysilane, n-propyltrimethoxysilane, isopropyltrimethoxysilane, n-butyltrimethoxysilane, tert-butyltrimethoxysilane, n-hexyltrimethoxysilane, n-octyltrimethoxysilane, isooctyltrimethoxysilane, dodecyltrimethoxysilane, octadecyltrimethoxysilane, cyclohexyltrimethoxysilane, benzyltrimethoxysilane, phenyltrimethoxysilane, phenyltriethoxysilane, 4-butylphenyltrimethoxysilane, 3-aminopropyltrimethoxysilane, 3-aminopropyltriethoxysilane, 3-glycidyloxypropyltrimethoxysilane, 3-glycidyloxypropyltriethoxysilane, 3-mercaptopropyltrimethoxysilane, 3-acryloyloxypropyltrimethoxysilane, 3-carboxypropyltrimethoxysilane, (3,3,3-trifluoropropyl)trimethoxysilane, (3,3,3-trifluoropropyl)triethoxysilane, pentafluorophenyltrimethoxysilane, and pentafluorophenyltriethoxysilane;

difunctional silanes such as dimethyldimethoxysilane, dimethyldiethoxysilane, dibutyldimethoxysilane, dihexyldimethoxysilane, didodecyldimethoxysilane, methyloctyldimethoxysilane, dodecylmethyldimethoxysilane, diphenyldimethoxysilane, and diphenyldiethoxysilane; and monofunctional silanes such as triethylmethoxysilane, triethylethoxysilane, tripropylmethoxysilane, triphenylmethoxysilane, triphenylethoxysilane, diphenylmethylmethoxysilane, and diphenylmethylethoxysilane.

Suitable partial hydrolytic condensates of hydrolyzable silanes which can be used herein include partial hydrolytic condensates of tetramethoxysilane which are commercially available under the tradename of M Silicate 51 from Tama Chemicals Co., Ltd., MSI51 from Colcoat Co., Ltd., MS51 and MS56 from Mitsubishi Chemical Co., Ltd., partial hydrolytic condensates of tetraethoxysilane which are commercially available under the tradename of Silicate 35 and Silicate 45 from Tama Chemicals Co., Ltd., ESI40 and ESI48 from Colcoat Co., Ltd., partial co-hydrolytic condensates of tetramethoxysilane and tetraethoxysilane which are commercially available under the tradename of FR-3 from Tama Chemicals Co., Ltd., and EMSi48 from Colcoat Co., Ltd.

Of these, preference is given to tetraalkoxysilanes such as tetramethoxysilane and tetraethoxysilane; trialkoxysilanes such as methyltrimethoxysilane, methyltriethoxysilane, n-propyltrimethoxysilane, isopropyltrimethoxysilane, n-butyltrimethoxysilane, n-hexyltrimethoxysilane, n-octyltrimethoxysilane, and dodecyltrimethoxysilane; dialkoxysilanes such as dimethyldimethoxysilane, dimethyldiethoxysilane, dibutyldimethoxysilane, dihexyldimethoxysilane, octylmethyldimethoxysilane, and dodecylmethyldimethoxysilane; and partial hydrolytic condensates of the foregoing.

As the alkoxysilane, fluoroalkyl or fluoroaryl-containing alkoxysilanes such as (3,3,3-trifluoropropyl)trimethoxysilane, (3,3,3-trifluoropropyl)triethoxysilane, pentafluorophenyltrimethoxysilane, and pentafluorophenyltriethoxysilane may also be used alone or in admixture, for imparting improved water resistance, humidity resistance and stain resistance to the surface treatment layer.

These hydrolyzable silanes and partial hydrolytic condensates thereof may be used alone or in admixture of two or more. From the standpoint of forming a surface treatment layer on composite zinc oxide nanoparticles, the amount of monofunctional silane used is preferably up to 70 mol % of the overall silanes. Similarly, the amount of tri- and tetrafunctional silanes used is preferably 1 to 90 mol % of the overall silanes. From the standpoint of improving the denseness of the surface treatment layer for enhancing water resistance, acid resistance, zinc anti-leaching, and photocatalysis-blocking ability, the amount of tri- and tetrafunctional silanes used is more preferably up to 80 mol %, even more preferably up to 70 mol % and more preferably at least 5 mol %, even more preferably at least 10 mol %.

The hydrolyzable silanes and partial hydrolytic condensates thereof are preferably used in such amounts that a ratio of moles of silicon atoms in the hydrolyzable silane to moles of total metal atoms in the composite zinc oxide nanoparticles may range from 0.1 to 100. For the purposes of increasing the content of zinc oxide per unit weight, the upper limit of the amount of hydrolyzable silane is such that the ratio is more preferably up to 70 and even more preferably up to 50. For the purposes of imparting anti-agglomeration to composite zinc oxide nanoparticles, the lower limit of the amount of hydrolyzable silane is such that the ratio is more preferably at least 0.5 and even more preferably at least 1.

For the surface treatment of composite zinc oxide nanoparticles, a basic organic compound is preferably used as the catalyst for hydrolysis of the hydrolyzable silane or partial hydrolytic condensate thereof and subsequent silanol condensation reaction. Suitable basic organic compounds include tertiary amines such as trimethylamine, triethylamine, tri-n-propylamine, triisopropylamine, tributylamine, diisopropylethylamine, triphenylamine, N-methylpyrrolidine, and N-methylpiperidine; and nitrogen-containing heterocyclics such as pyridine, methylpyridine, dimethylpyridine, trimethylpyridine and quinoline. Of these, preferred are tertiary amines of 6 to 12 carbon atoms such as triethylamine, tri-n-propylamine, triisopropylamine, tributylamine, diisopropylethylamine, N-methylpyrrolidine, and N-methylpiperidine.

The basic organic compound is preferably used in an amount of 0.001 to 10% by weight based on the hydrolyzable silane or partial hydrolytic condensate. For the purposes of controlling reaction and imparting anti-agglomeration to composite zinc oxide nanoparticles, the maximum amount of basic compound is more preferably up to 8 wt %, and even more preferably up to 5 wt %. From the standpoint of reaction rate or the like, the minimum amount of basic compound is more preferably at least 0.002 wt %, and even more preferably at least 0.005 wt %.

The amount of water used for hydrolysis of the hydrolyzable silane or partial hydrolytic condensate is preferably such that the moles of water is 0.1 to 10 times the moles of hydrolyzable groups in the hydrolyzable silane. For the purposes of controlling hydrolysis of the hydrolyzable silane and silanol condensation reaction, the moles of water is more preferably up to 7 times, even more preferably up to 5 times the moles of hydrolyzable groups. From the standpoints of hydrolysis and silanol condensation reaction, the moles of water is more preferably at least 0.3 time, even more preferably at least 0.5 time the moles of hydrolyzable groups.

With respect to the surface treatment of composite zinc oxide nanoparticles, the procedure and order of addition of the hydrolyzable silane or partial hydrolytic condensate, basic organic compound, and water are not particularly limited. Exemplary procedures, all starting with a liquid phase containing the composite zinc oxide nanoparticles, include (1) a procedure of first adding the hydrolyzable silane to the liquid phase, then adding the basic organic compound and water sequentially or simultaneously thereto, (2) a procedure of first adding the basic organic compound to the liquid phase, then adding the hydrolyzable silane and water sequentially or simultaneously thereto, and (3) a procedure of premixing the hydrolyzable silane, basic organic compound and water, and adding the premix to the liquid phase. Of these, the step of finally adding water is preferred for the control of reaction, and the procedure including first adding the hydrolyzable silane to the liquid phase, then adding the basic organic compound, and finally adding water is most preferred.

From the standpoint of dispersion stability, it is preferred to add a dispersant to the (surface-coated) composite zinc oxide nanoparticle dispersion. Since the dispersant has an organic functional group that adsorbs and orients to surfaces of inorganic particles, and plays the role of protecting nanoparticles, it is essential in preparing a dispersion having a high stability. Exemplary organic functional groups include hydroxyl, carboxyl, sulfonic acid, phosphoric acid, amino, imino, quaternary ammonium, quaternary phosphonium, and salts of the foregoing, amide, and acetylacetonato groups. Of these, carboxyl, phosphoric acid groups, and sodium and ammonium salts thereof are preferred. The preferred compounds having such a functional group and contributing more to dispersion are organic polymers having these functional groups on side chains. Exemplary dispersants include organic polymers derived from at least one of functional monomers such as (meth)acrylic acid, phosphoric acid group-containing (meth) acrylates, hydroxyalkyl (meth)acrylates, maleic anhydride, and sulfonic acid group-containing styrene, and more preferably ionic surfactants such as polyacrylates including (meth) acrylic acid, maleic anhydride, and phosphoric acid group-containing (meth)acrylates, polyester amines, fatty acid amines, sulfonic acid amides, caprolactones, quaternary ammonium salts; nonionic surfactants such as polyoxyethylene and polyol esters; water-soluble polymers such as hydroxypropyl cellulose, and polysiloxane. Useful dispersants are commercially available under the tradename of Poise 520, 521, 532A and 2100 (Kao Corp.), Disperbyk 102, 161, 162, 163, 164, 180 and 190 (BYK), Aron T-40 (To a Gosei Co., Ltd.), Solsperse 3000, 9000, 17000, 20000, and 24000 (Zeneka Co., Ltd.). They may be used alone or in admixture.

The dispersant is preferably used in an amount of 0.5 to 30 parts, more preferably 1 to 20 parts by weight per 100 parts by weight as solids of the (surface-coated) composite zinc oxide nanoparticles. Less than 0.5 pbw of the dispersant may fail to achieve the desired effect. More than 30 pbw of the dispersant may detract from the mar resistance and weatherability of a coating.

The (surface-coated) composite zinc oxide nanoparticle dispersion (A) is a dispersion of the (surface-coated) composite zinc oxide nanoparticles described above in a dispersing medium. The dispersing medium used herein is not particularly limited. Exemplary media include water, alcohols such as methanol, ethanol, isopropanol, n-butanol, isobutanol, stearyl alcohol, oleyl alcohol, and lauryl alcohol, aromatic hydrocarbons such as toluene and xylene, esters such as ethyl acetate and butyl acetate, ketones such as methyl ethyl ketone and methyl isobutyl ketone, glycol ethers such as ethyl cellosolve and propylene glycol monomethyl ether, and saturated hydrocarbons such as n-hexane, and mixtures thereof.

The amount of the (surface-coated) composite zinc oxide nanoparticles dispersed is not particularly limited.

They are preferably dispersed in a concentration as high as possible, but in a range not breaking dispersion. Usually the dispersion contains 5 to 80% by weight, preferably 10 to 60% by weight of the (surface-coated) composite zinc oxide nanoparticles. A concentration of less than 5 wt % corresponds to a higher proportion of the dispersing medium, which may result in a lower concentration of total solids after addition of silicone resin (B) thereto, failing to form a coating with an appropriate thickness. A concentration in excess of 80 wt % may impair dispersion stability or cause a viscosity buildup and hence, handling inconvenience.

A mechanical grinding/dispersing apparatus may be any of well-known apparatus such as a bead mill, jet mill, attritor, sand mill, ultrasonic mill, and disk mill. The bead mill using beads is preferred because component (A) is finished shortly. Exemplary bead mills include Minizeta, Labstar, Star Mill LMZ and Star Mill ZRS by Ashizawa Finetec, Ltd., Ultra-Apex Mill by Kotobuki Industries Co., Ltd., and Maxvisco Mill by Imex Co., Ltd. The dispersing time varies depending on the diameter and identity of beads, and the peripheral speed of the mill. In general, beads of a ceramic material such as alumina or zirconia having a diameter of 0.03 to 0.5 mm are used. The bead mill is preferably operated for a milling time of 20 minutes to 5 hours, more preferably 30 minutes to 3 hours.

When the dispersant described above is used, it should preferably be co-present when the (surface-coated) composite zinc oxide nanoparticles and dispersing medium are mechanically ground and dispersed on the above-mentioned apparatus. If only the (surface-coated) composite zinc oxide nanoparticles and dispersing medium are mechanically ground and dispersed before the dispersant is added, the resulting agglomerates may be difficulty disintegrated to the desired average particle size.

The composite zinc oxide nanoparticles in the dispersion as component (A) should preferably have an average particle size (volume average particle size $D_{50}$) in the range of 10 to 200 nm as measured by the light scattering method. Particles with an average particle size in excess of 200 nm may lead to a coating having low visible light transmittance. A volume average particle size $D_{50}$ of up to 150 nm is more preferred. Particles with a volume average particle size $D_{50}$ of less than 10 nm may be inconvenient to handle. While the particle size distribution does not depend on a measuring instrument, the average particle size is defined herein as measured by Nanotrac UPA-EX150 by Nikkiso Co., Ltd. or LA-910 by Horiba Mfg. Co., Ltd.

It is noted that component (A) used herein is commercially available, for example, as ZNTAB 15 wt %-E16, E15, E16-(1), and E16-(2) by C.I. Kasei Co., Ltd.

Component (A) is compounded with component (B) such that the (surface-coated) composite zinc oxide nanoparticles as solids in component (A) are preferably present in an amount of 1 to 50% by weight, more preferably 3 to 35% by weight, based on the solids of the silicone resin (B). If the amount of the (surface-coated) composite zinc oxide nanoparticles as solids is less than 1 wt %, the desired UV shielding capability may not be obtainable. If the amount of the (surface-coated) composite zinc oxide nanoparticles as solids is more than 50 wt %, it may be difficult to form a coating having visible light transparency and mar resistance.

Component B

Component (B) in the silicone coating composition is a silicone resin obtained from (co)hydrolytic condensation of at least one member selected from alkoxysilanes and partial hydrolytic condensates thereof. The alkoxysilane has the general formula (1):

$(R^1)_m(R^2)_n Si(OR^3)_{4-m-n}$      (1)

wherein $R^1$ and $R^2$ are each independently hydrogen or a substituted or unsubstituted monovalent hydrocarbon group, and $R^1$ and $R^2$ may bond together, $R^3$ is a $C_1$-$C_3$ alkyl group, and m and n are independently 0 or 1 and m+n is 0, 1 or 2.

In formula (1), $R^1$ and $R^2$ are each independently selected from hydrogen and substituted or unsubstituted monovalent hydrocarbon groups, preferably of 1 to 12 carbon atoms, more preferably 1 to 8 carbon atoms, for example, hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl, and 3,3,3-trifluoropropyl; and (meth)acryloxy, epoxy, mercapto, amino or isocyanato-substituted hydrocarbon groups such as γ-methacryloxypropyl, γ-glycidoxypropyl, 3,4-epoxycyclohexylethyl, γ-mercaptopropyl, γ-aminopropyl, and γ-isocyanatopropyl. An isocyanurate group having a plurality of isocyanato-substituted hydrocarbon groups bonded together is also exemplary. Of these, alkyl groups are preferred for the application where mar resistance and weatherability are required, and epoxy, (meth)acryloxy and isocyanurate-substituted hydrocarbon groups are preferred where toughness and dyeability are required.

$R^3$ is selected from $C_1$-$C_3$ alkyl groups, for example, methyl, ethyl, n-propyl, and isopropyl. Of these, methyl and ethyl are preferred because the alkoxysilane is highly reactive in hydrolytic condensation and the alcohol $R^3OH$ formed can be readily distilled off due to a high vapor pressure.

The alkoxysilane of formula (1) wherein m=0 and n=0 is (a-1) a tetraalkoxysilane of the formula: $Si(OR^3)_4$ or a partial hydrolytic condensate thereof. Examples of suitable tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (1) wherein m=1 and n=0 or m=0 and n=1 is (a-2) a trialkoxysilane of the formula: $R^1Si(OR^3)_3$ or $R^2Si(OR^3)_3$ or a partial hydrolytic condensate thereof. Examples of suitable trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, tris(3-trimethoxysilylpropyl)isocyanurate and tris(3-triethoxysilylpropyl)isocyanurate in which isocyanate groups are bonded together; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (1) wherein m=1 and n=1 is (a-3) a dialkoxysilane of the formula: $(R^1)(R^2)Si(OR^3)_2$ or a partial hydrolytic condensate thereof. Examples of suitable dialkoxysilane and partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The silicone resin as component (B) may be prepared using the foregoing components (a-1), (a-2) and (a-3) in any desired proportion. For the purpose of improving storage stability, mar resistance and crack resistance, it is preferred to use 0 to 50 Si-mol % of component (a-1), 50 to 100 Si-mol % of component (a-2) and 0 to 10 Si-mol % of component (a-3), based on the total amount of components (a-1), (a-2) and (a-3) which is equal to 100 Si-mol %. It is more preferred to use 0 to 30 Si-mol % of component (a-1), 70 to 100 Si-mol % of component (a-2) and 0 to 10 Si-mol % of component (a-3). If the main component (a-2) is less than 50 Si-mol %, the resin may have a lower crosslinking density and less curability, tending to form a cured film with a lower hardness. If component (a-1) is in excess of 50 Si-mol %, the resin may have a higher crosslinking density and a lower toughness to permit crack formation.

It is noted that Si-mol % is a percentage based on the total Si moles, and the Si mole means that in the case of a monomer, its molecular weight is 1 mole, and in the case of a dimer, its average molecular weight divided by 2 is 1 mole.

The silicone resin as component (B) may be prepared through (co)hydrolytic condensation of components (a-1), (a-2) and (a-3) by a well-known method. For example, an alkoxysilane (a-1), (a-2) or (a-3) or partial hydrolytic condensate thereof or a mixture thereof is (co)hydrolyzed in water at pH 1 to 7.5, preferably pH 2 to 7. At this point, metal oxide nanoparticles dispersed in water such as silica sol may be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylic or sulfonic acid groups on the surface, and water-dispersed metal oxide nanoparticles such as acidic water-dispersed silica sol. Alternatively, a dispersion of metal oxide nanoparticles in water or organic solvent such as silica sol may be co-present upon hydrolysis. In case the dispersing medium of the (surface-coated) composite zinc oxide nanoparticle dispersion as component (A) is water or a water-soluble organic solvent, it is acceptable to mix water, an acidic hydrolytic catalyst and alkoxysilane in the co-presence of this dispersion so that hydrolytic condensation reaction may take place. This process is advantageous because the dispersion of the (surface-coated) composite zinc oxide nanoparticles in component (A) is improved, despite a possibility of partial reaction between surfaces of the (surface-coated) composite zinc oxide nanoparticles in component (A) and the hydrolytic condensate of alkoxysilane.

In this hydrolysis, water may be used in an amount of 20 to 3,000 parts by weight per 100 parts by weight of the total of alkoxysilanes (a-1), (a-2) and (a-3) and partial hydrolytic condensates thereof. An excess of water may lower system efficiency and in a final coating composition, residual water can adversely affect coating operation and drying. Water is preferably used in an amount of 50 parts by weight to less than 150 parts by weight for the purpose of improving storage stability, mar resistance, and crack resistance. With a smaller amount of water, the silicone resin may fail to reach a weight average molecular weight in the optimum range, as measured by GPC versus polystyrene standards. With an excess of water, the content in the silicone resin of units $R'SiO_{3/2}$ in units $R'SiO_{(3-p)/2}(OX)_p$ derived from component (a-2) may fail to reach the optimum range to maintain a coating crack resistant wherein R' is $R^1$ or $R^2$, X is hydrogen or $R^3$, $R^1$, $R^2$, and $R^3$ are as defined above, and p is an integer of 0 to 3.

Hydrolysis may be effected by adding dropwise or pouring water to the alkoxysilane or partial hydrolytic condensate, or inversely by adding dropwise or pouring the alkoxysilane or partial hydrolytic condensate to water. The reaction system may contain an organic solvent. However, the absence of organic solvent is preferred because there is a tendency that as the reaction system contains more organic solvent, the resulting silicone resin has a lower weight average molecular weight as measured by GPC versus polystyrene standards.

To produce the silicone resin (B), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation or the concentration, or a dispersion of metal oxide nanoparticles in water or organic solvent such as silica sol or the (surface-coated) composite zinc oxide nanoparticle dispersion (A) may also be added. For the reason that a silicone resin generally builds up its molecular weight and reduces its solubility in water or alcohol formed as condensation proceeds, the organic solvent added herein should preferably be one having a boiling point of at least 80° C. and a relatively highly polarity in which the silicone resin is fully dissolvable. Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate (PGMEA); and esters such as propyl acetate, butyl acetate, and cyclohexyl acetate.

The silicone resin resulting from condensation should preferably have a weight average molecular weight (Mw) of at least 1,500, more preferably 1,500 to 50,000, and even more preferably 2,000 to 20,000, as measured by GPC versus polystyrene standards. With a Mw below the range, a coating tends to be less tough and prone to cracking. On the other hand, a silicone resin with too high a Mw tends to have a low hardness and the resins in a coating undergo phase separation, incurring film whitening.

Component C

Component (C) is a curing catalyst which may be selected from those catalysts commonly used in silicone coating compositions. The curing catalyst serves to promote condensation reaction of condensable groups such as silanol and alkoxy groups in silicone resin (B). Suitable catalysts include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide (TMAH), tetramethylammonium acetate, n-hexylamine, tributylamine, diazabicycloundecene (DBU), and dicyandiamide; metal-containing compounds such as tetraisopropyl titanate, tetrabutyl titanate, acetylacetonatotitanium, aluminum triisobutoxide, aluminum triisopropoxide, tris(acetylacetonato) aluminum, aluminum diisopropoxy(ethyl acetoacetate), aluminum perchlorate, aluminum chloride, cobalt octylate, (acetylacetonato)cobalt, (acetylacetonato)iron, (acetylacetonato)tin, dibutyltin octylate, and dibutyltin laurate; and acidic compounds such as p-toluenesulfonic acid and trichloroacetic acid. Of these, preference is given to sodium propionate, sodium acetate, sodium formate, trimethylbenzylammonium hydroxide, tetramethylammonium hydroxide, tris(acetylacetonato)aluminum, and aluminum diisopropoxy(ethyl acetoacetate).

Another useful curing catalyst is an aromatic-free compound having the general formula (3). The silicone coating composition loaded with this catalyst becomes shelf stable while remaining curable and crack resistant.

$$[(R^6)(R^7)(R^8)(R^9)M]^+\cdot X^- \quad (3)$$

Herein $R^6$, $R^7$, $R^8$ and $R^9$ are each independently a $C_1$-$C_{18}$ alkyl group which may be substituted with halogen, each of $R^6$, $R^7$, $R^8$ and $R^9$ has a Taft-Dubois steric substituent constant Es, the total of constants Es of $R^6$, $R^7$, $R^8$ and $R^9$ is up to −0.5, M is an ammonium or phosphonium cation, and $X^-$ is a halide anion, hydroxide anion or $C_1$-$C_4$ carboxylate anion.

Taft-Dubois steric substituent constant Es is a rate of esterification reaction of a substituted carboxylic acid under acidic conditions relative to methyl group $CH_3$ and represented by the equation:

$$Es = \log(k/k0)$$

wherein k is a rate of acidic esterification reaction of a substituted carboxylic acid under specific conditions and k0 is a rate of acidic esterification reaction of methyl-substituted carboxylic acid under the same conditions. See J. Org. Chem., 45, 1164 (1980) and J. Org. Chem., 64, 7707 (1999).

In general, Taft-Dubois steric substituent constant Es is an index representing the steric bulkiness of a substituent. For example, the value of constant Es is 0.00 for methyl, −0.08 for ethyl, −0.31 for n-propyl, and −0.31 for n-butyl, indicating that the lower (or more negative) the Es, the more sterically bulky is the substituent.

In formula (3), the total of constants Es of $R^6$, $R^7$, $R^8$ and $R^9$ should be equal to or more negative than −0.5. If the total of constants Es is above −0.5, a coating composition becomes low in shelf stability and forms a coat which can be cracked or whitened in a water-resistant test and loses adhesion, especially water-resistant adhesion and boiling adhesion. In the event the total of constants Es is above −0.5, for example, $R^6$, $R^7$, $R^8$ and $R^9$ are all methyl, a corresponding catalyst of formula (3) becomes higher in catalytic activity, but a coating composition comprising the same tends to lose shelf stability and a coat thereof becomes so hygroscopic as to develop defects in a water-resistant test. The total of constants Es of $R^6$, $R^7$, $R^8$ and $R^9$ is preferably not lower than −3.2, and more preferably not lower than −2.8.

In the above formula, $R^6$, $R^7$, $R^8$ and $R^9$ are alkyl groups of 1 to 18 carbon atoms, preferably 1 to 12 carbon atoms, which may be substituted with halogen, for example, alkyl groups such as methyl, ethyl, propyl, butyl, pentyl, hexyl, heptyl, and octyl; cycloalkyl groups such as cyclopentyl and cyclohexyl; and halo-alkyl groups such as chloromethyl, γ-chloropropyl and 3,3,3-trifluoropropyl.

M is an ammonium or phosphonium cation. $X^-$ is a halide anion, hydroxide anion or $C_1$-$C_4$ carboxylate anion, and preferably a hydroxide anion or acetate anion.

Illustrative examples of the curing catalyst having formula (3) include, but are not limited to, hydroxides such as tetra-n-propylammonium hydroxide, tetra-n-butylammonium hydroxide, tetra-n-pentylammonium hydroxide, tetra-n-hexylammonium hydroxide, tetracyclohexylammonium hydroxide, tetrakis(trifluoromethyl)ammonium hydroxide, trimethylcyclohexylammonium hydroxide, trimethyl(trifluoromethyl)ammonium hydroxide, trimethyl-t-butylammonium hydroxide, tetra-n-propylphosphonium hydroxide, tetra-n-butylphosphonium hydroxide, tetra-n-pentylphosphonium hydroxide, tetra-n-hexylphosphonium hydroxide, tetracyclohexylphosphonium hydroxide, tetrakis(trifluoromethyl)phosphonium hydroxide, trimethylcyclohexylphosphonium hydroxide, trimethyl(trifluoromethyl)phosphonium hydroxide, and trimethyl-t-butylphosphonium hydroxide; salts of the foregoing hydroxides with halogenic acids and with $C_1$-$C_4$ carboxylic acids. Inter alia, tetrapropylammonium hydroxide, tetrapropylammonium acetate, tetrabutylammonium hydroxide, tetrabutylammonium acetate, tetrabutylphosphonium hydroxide, and tetrabutylphosphonium acetate are preferred. These may be used alone or in admixture of two or more, or in combination with any of the aforementioned well-known curing catalysts.

Insofar as component (C) is compounded in an effective amount to cure the silicone resin (B), the amount of the catalyst is not particularly limited. Specifically the curing catalyst is preferably used in an amount of 0.0001 to 30% by weight, more preferably 0.001 to 10% by weight, based on the solids of the silicone resin. Less than 0.0001 wt % of the catalyst may lead to under-cure and low hardness. More than 30 wt % of the catalyst may lead to a coating which is prone to cracking and poorly water resistant.

Component D

Component (D) is a solvent. The solvent is not particularly limited as long as components (A) to (C) are dissolvable or dispersible therein. A solvent mainly comprising a highly polar organic solvent is preferred. Exemplary solvents include alcohols such as methanol, ethanol, isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate. The solvents may be used alone or in admixture.

Component (D) is preferably added in such an amount that the silicone coating composition may have a solids concentration of 1 to 30% by weight, more preferably 5 to 25% by weight. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is prone to brushing, whitening or cracking.

Component E

The composition may further comprise (E) colloidal silica. Particularly when it is desired to enhance the hardness and mar resistance of a coating, an appropriate amount of colloidal silica may be added. It is a colloidal dispersion of nano-size silica having a particle size of about 5 to 50 nm in a medium such as water or organic solvent. Commercially available water-dispersed or organic solvent-dispersed colloidal silica may be used herein. Examples include Snowtex-O, OS, OL and Methanol Silica Sol by Nissan Chemical Industries Ltd. The colloidal silica may be compounded in an amount of 0 to 100 parts, preferably 5 to 100 parts, and more preferably 5 to 50 parts by weight per 100 parts by weight as solids of the silicone resin (B).

If desired, suitable additives may be added to the silicone coating composition insofar as they do not adversely affect the invention. Suitable additives include pH adjustors, leveling agents, thickeners, pigments, dyes, metal oxide nanoparticles, metal powder, antioxidants, UV absorbers, UV stabilizers, heat ray reflecting/absorbing agents, flexibilizers, antistatic agents, anti-staining agents, and water repellents.

For enhanced storage stability, the silicone coating composition may preferably be adjusted to pH 2 to 7, more preferably pH 3 to 6. Since a pH value outside the range may lessen storage stability, a pH adjustor may be added so that the pH falls in the range. For a silicone coating composition having a pH value outside the range, if the pH is more acidic than the range, a basic compound such as ammonia or ethylenediamine may be added for pH adjustment. If the pH is more basic than the range, an acidic compound such as hydrochloric acid, nitric acid, acetic acid or citric acid may be added for pH adjustment. The pH adjustment method is not particularly limited.

When the substrate to be coated with the silicone coating composition is made of an organic resin or wood, a UV absorber and/or UV stabilizer other than component (A) may be added to the silicone coating composition for the purpose of preventing the substrate from yellowing or surface degradation. The UV absorber and/or UV stabilizer which is compatible with the silicone coating composition and low volatile is preferred.

Examples of the UV absorber include well-known inorganic oxides such as cerium oxide and zirconium oxide, excluding the (surface-coated) composite zinc oxide nanoparticles as component (A), and those oxides having controlled photocatalytic activity are preferred for further enhancing the UV shielding function. Metal chelate compounds of titanium, zinc, and zirconium and (partial) hydrolyzates and condensates thereof are also useful. Preferred organic examples include derivatives of compounds having hydroxybenzophenone, benzotriazole, cyanoacrylate and triazine as a main skeleton. Also included are polymers such as vinyl polymers having the UV absorber incorporated in a side chain and copolymers thereof with another vinyl monomer, and silyl-modified UV absorbers, and (partial) hydrolytic condensates thereof.

Exemplary UV absorbers include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenylacrylate, 2-ethylhexyl-2-cyano-3,3'-diphenyl acrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with γ-glycidoxypropyltrimethoxysilane, the reaction product of 2,2',4,4'-tetrahydroxybenzophenone with γ-glycidoxypropyltrimethoxysilane, and (partial) hydrolyzates thereof. These organic UV absorbers may be used alone or in admixture.

The UV absorber is preferably compounded in an amount of 0 to 100% by weight, and when used, in an amount of more preferably 0.3 to 100%, even more preferably 0.3 to 30% by weight based on the solids in the silicone coating composition.

Preferred as the UV stabilizer are compounds having at least one cyclic hindered amine structure in a molecule, which are compatible with the silicone coating composition and low volatile. Exemplary UV stabilizers include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, the condensate of 1,2,3,4-butanetetracarboxylic acid, 2,2,6,6-tetramethyl-4-piperidinol and tridecanol, 8-acetyl-3-dodecyl-7,7,9,9-tetramethyl-1,3,8-triazaspiro-[4,5]decane-2,4-dione, the condensate of 1,2,3,4-butanetetracarboxylic acid, 1,2,6,6-pentamethyl-4-piperidinol and β,β,β,β'-tetramethyl-3,9-(2,4,8,10-tetraoxaspiro[5,5]undecane)diethanol, and the condensate of 1,2,3,4-butanetetracarboxylic acid, 2,2,6,6-pentamethyl-4-piperidinol and β,β,β,β'-tetramethyl-3,9-(2,4,8,10-tetraoxaspiro[5,5]undecane)diethanol. Also useful are photostabilizers which are modified by silylation for the purpose of anchoring the photostabilizers as described in JP-B S61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photostabilizers may be used in admixture of two or more.

The UV stabilizer is preferably compounded in an amount of 0 to 10% by weight, and when used, in an amount of more preferably 0.03 to 10%, even more preferably 0.03 to 7.5% by weight based on the solids in the silicone coating composition.

The silicone coating composition may be obtained by mixing selected amounts of the respective components in a standard manner.

The silicone coating composition may be applied to at least one surface of a substrate directly or via another layer or layers. It is then cured to yield a coated article. The silicone coating composition may be applied to the substrate by any ordinary coating techniques. Suitable coating techniques include brush coating, spray coating, dipping, flow coating, roll coating, curtain coating, spin coating, and knife coating.

The substrate used herein is not particularly limited and includes molded plastics, wood items, ceramics, glass, metals, and composites thereof. Of these, plastic materials or organic resin substrates are preferred. Examples include polycarbonate, polystyrene, acrylic resins, modified acrylic resins, urethane resins, thiourethane resins, polycondensates of halogenated bisphenol A and ethylene glycol, acrylic urethane resins, halogenated aryl-containing acrylic resins, and sulfur-containing resins. These resin substrates which have been surface treated, specifically by conversion treatment, corona discharge treatment, plasma treatment, acid or alkaline treatment are also useful. Also included are laminated substrates comprising a resin substrate and a surface layer formed thereon from a resin of different type from the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

After the silicone coating composition is applied, the coating may be air dried or heated to form a cured film. The curing temperature and time are not particularly limited although the coating is preferably heated at a temperature below the heat resistant temperature of the substrate for 10 minutes to 2 hours. More preferably the coating is heated at a temperature of 80 to 135° C. for 30 minutes to 2 hours.

The thickness of the cured film is not particularly limited and may be selected as appropriate for a particular application. The cured film preferably has a thickness of 0.1 to 50 μm, and more preferably in the range of 1 to 20 μm for ensuring that the cured film has hardness, mar resistance, long-term stable adhesion and crack resistance.

The silicone coating composition of the invention is characterized by visible light transmittance in coating form. An index of visible light transmittance is the haze of a film. In general, the haze increases as the film becomes thicker. The film having a thickness of up to 5 μm preferably meets a haze of up to 2.0, more preferably up to 1.5, and even more preferably up to 1.0. The haze is measured by a haze meter NDH2000 (Nippon Denshoku Industries Co., Ltd.).

The silicone coating composition is also characterized by mar resistance in coating form. An index of mar resistance is a delta haze value (ΔHz) in the Taber abrasion test. Specifically, a ΔHz value is determined according to ASTM D1044 by mounting a Taber abrasion tester with abrasion wheels SC-10F, measuring the haze after 500 turns under a load of 500 g, and calculating a difference (ΔHz) between haze values before and after the test. The film having a thickness of up to 5 μm preferably has ΔHz of up to 15.0, more preferably up to 13.0, and even more preferably up to 10.0.

The silicone coating composition is further characterized by weather resistance in coating form. An index of weather resistance is given by a weathering test to see whether or not a coating is kept intact, that is, whether or not a coating is cracked. To examine the development of cracks in a coating, the weathering test is carried out by using Eyesuper UV tester W-151 (Iwasaki Electric Co., Ltd.), and repeating cycles consisting of [black panel temperature 63° C., humidity 50% RH, illuminance 50 mW/cm$^2$, raining intervals of 10 sec/hour for 5 hours] and [black panel temperature 30° C., humidity 95% RH for one hour]. Those samples whose coating undergoes no cracking after 250 hours, preferably after 300 hours, and more preferably after 500 hours are regarded as passing the test. Cracks in the coating are visually inspected.

The silicone coating composition may be applied to the surface of a substrate directly or via another layer or layers. Suitable intervening layers include a primer layer, UV-absorbing layer, printing layer, recording layer, heat-ray shielding layer, adhesive layer, inorganic vapor-deposited layer and the like.

The primer layer is preferably formed of acrylic resin primers, and more preferably primers based on vinyl copolymers having organic UV-absorptive groups and alkoxysilyl groups on side chains. Such primers are exemplified in JP 4041968, JP-A 2008-120986, and JP-A 2008-274177.

In the vinyl copolymer having an organic UV-absorptive group and an alkoxysilyl group bonded to side chains, preferably the alkoxysilyl group is bonded to the vinyl copolymer backbone via a Si—C bond, and more preferably the organic UV-absorptive group is also bonded to the vinyl copolymer backbone. Such copolymers may be obtained from copolymerization of monomeric components: (a) a vinyl monomer having an alkoxysilyl group bonded thereto via a Si—C bond, (b) a vinyl monomer having an organic UV-absorptive group, and (c) another monomer copolymerizable therewith.

In addition to the vinyl copolymer having organic UV-absorptive groups and alkoxysilyl groups on side chains, the primer composition may preferably comprise colloidal silica dispersed in an organic solvent. Suitable organic solvents include methanol, ethanol, isopropanol, n-butanol, ethylene glycol, ethyl cellosolve, butyl cellosolve, propylene glycol monomethyl ether, propylene glycol monomethyl ether acetate (PGMEA), dimethylformamide, dimethylacetamide, methyl ethyl ketone, methyl isobutyl ketone, and xylene/n-butanol mixtures. Of these, ethylene glycol, ethyl cellosolve, butyl cellosolve, propylene glycol monomethyl ether, PGMEA, methyl ethyl ketone, and methyl isobutyl ketone are preferred when the solubility of the vinyl copolymer is taken into account.

A coated article may be produced by applying a primer to an organic resin substrate, applying the silicone coating composition on the primer layer, and curing the silicone coating. This coated article has a higher degree of weather resistance because of the synergy of the UV-shielding ability of the silicone coating combined with organic UV-absorptive groups in the primer layer.

EXAMPLE

Synthesis Examples, Examples and Comparative Examples are given below by way of illustration and not by way of limitation. Unless otherwise stated, all parts and percents are by weight. The viscosity is as measured at 25° C. according to JIS Z 8803. Mw denotes a weight average molecular weight as determined by gel permeation chromatography (GPC) using polystyrene standards.

Surface-Coated Composite Zinc Oxide Nanoparticle Dispersion (A)

Figure 1:
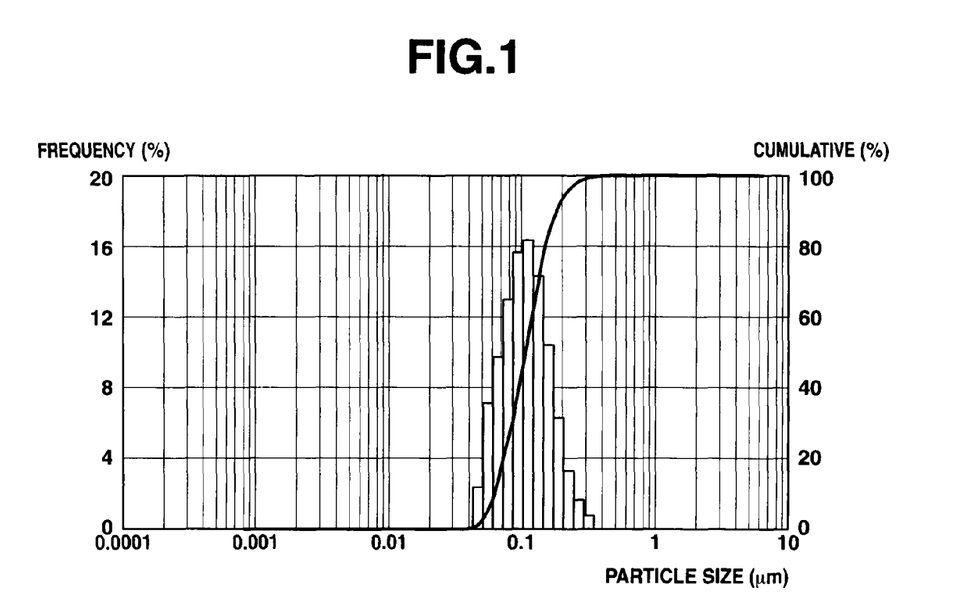
FIG. 1 is a diagram showing a particle size distribution of composite zinc oxide nanoparticles in dispersion (A-1) used in Example.

A-1: ZNTAB 15 wt %-E16(2) by C.I. Kasei Co., Ltd. (a dispersion obtained by applying silica to zinc oxide nanoparticles prepared by DC arc plasma method, surface treating them with methyltrimethoxysilane, and dispersing them in an alcohol mixture with the aid of a dispersant, solids concentration: 15%, particle size distribution measured by Nanotrac UPA-EX150 (Nikkiso Co., Ltd.): FIG. 1, average particle size (volume average particle size $D_{50}$): 105 nm)

A-2: ZNTAB 15 wt %-E15 by C.I. Kasei Co., Ltd. (a dispersion obtained by applying alumina to zinc oxide nanoparticles prepared by DC arc plasma method and dispersing them in an alcohol mixture with the aid of a dispersant, solids concentration: 15%, average particle size (volume average particle size $D_{50}$): 98 nm)

Synthesis of Silicone Resin (B)

Synthesis Example 1

A 2-L flask was charged with 287 g (2.11 Si-mol) of methyltrimethoxysilane and cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone was poured to the reaction mixture, which was heated under atmospheric pressure until the liquid temperature reached 92° C., for distilling off the methanol resulting from hydrolysis and allowing condensation to run. To the reaction mixture were added 400 g of isopropanol as a diluent, 0.5 g of leveling agent KP-341 (Shin-Etsu Chemical Co., Ltd.), 1.6 g of acetic acid, and 1.6 g of 25% tetramethylammonium hydroxide (TMAH) aqueous solution. The mixture was stirred and filtered through a paper filter, yielding a colorless clear silicone resin solution (B-1) having a nonvolatile concentration of 19.2%, a Mw of 2,510, and a polydispersity index of 1.84.

Synthesis Example 2

A 2-L flask was charged with 321 g (2.36 Si-mol) of methyltrimethoxysilane, 21 g (0.13 Si-mol) of 3,3,3-trifluoropropyltrimethoxysilane and 56 g (0.33 Si-mol) of Silicate 35 (Tama Chemicals Co., Ltd., partial hydrolytic condensate of tetraethoxysilane, dimer on average), which were thoroughly mixed. The flask was cooled to a fluid temperature of about 10° C. Then 308 g of 0.25N acetic acid aqueous solution was added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of PGMEA was poured to the reaction mixture, which was heated under atmospheric pressure until the liquid temperature reached 92° C., for distilling off the methanol and ethanol resulting from hydrolysis and allowing condensation to run. To the reaction mixture were added 400 g of isobutanol as a diluent, 0.5 g of leveling agent KP-341 (Shin-Etsu Chemical Co., Ltd.), and 134 g of 0.25% tetrabutylammonium hydroxide (TBAH) aqueous solution. The mixture was stirred and filtered through a paper filter, yielding a colorless clear silicone resin solution (B-2) having a nonvolatile concentration of 19.5%, a Mw of 3,180, and a polydispersity index of 1.96.

Synthesis Example 3

A 2-L flask was charged with 259 g (1.90 Si-mol) of methyltrimethoxysilane and 43 g (0.21 Si-mol) of isocyanurate silane X-12-965 (Shin-Etsu Chemical Co., Ltd., tris(3-trimethoxysilylpropyl)isocyanurate), which were thoroughly mixed. The flask was cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone was poured to the reaction mixture, which was heated under atmospheric pressure until the liquid temperature reached 92° C., for distilling off the methanol resulting from hydrolysis and allowing condensation to run. To the reaction mixture were added 400 g of isopropanol as a diluent, 0.5 g of leveling agent KP-341 (Shin-Etsu Chemical Co., Ltd.), 1.6 g of acetic acid, and 1.6 g of 25% tetramethylammonium hydroxide (TMAH) aqueous solution. The mixture was stirred and filtered through a paper filter, yielding a colorless clear silicone resin solution (B-3) having a nonvolatile concentration of 21.3%, a Mw of 5,490, and a polydispersity index of 2.90.

Synthesis of Silicone Resin (B) in the Presence of Surface-Coated Composite Zinc Oxide Nanoparticle Dispersion (A)

Synthesis Example 4

A 2-L flask was charged with 287 g (2.11 Si-mol) of methyltrimethoxysilane and cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone and 57 g of the surface-coated composite zinc oxide nanoparticle dispersion (A-1) were poured to the reaction mixture, which was heated under atmospheric pressure until the liquid temperature reached 90° C., for distilling off the methanol resulting from hydrolysis and allowing condensation to run. To the reaction mixture were added 400 g of isopropanol as a diluent, 0.5 g of leveling agent KP-341 (Shin-Etsu Chemical Co., Ltd.), 1.6 g of acetic acid, and 1.6 g of 25% tetramethylammonium hydroxide (TMAH) aqueous solution. The mixture was stirred and filtered through a paper filter, yielding a white silicone resin solution (AB-1) containing surface-coated composite zinc oxide nanoparticles and having a nonvolatile concentration of 19.6%, a Mw of 2,740, and a polydispersity index of 1.88.

Synthesis of Primer Based on Vinyl Polymer Having Organic UV-Absorptive Group and Alkoxysilyl Group Bonded to Side Chains

Synthesis Example 5

A 2-L flask equipped with a stirrer, condenser and thermometer was charged with 152 g of diacetone alcohol, which was heated at 80° C. under a nitrogen stream. A monomer mix solution was previously prepared by mixing 67.5 g of 2-[2'-hydroxy-5'-(2-methacryloxyethyl)phenyl]-2H-benzotriazole (RUVA-93, Otsuka Chemical Co., Ltd.), 90 g of γ-methacryloxypropyltrimethoxysilane, 270 g of methyl methacrylate, 22.5 g of glycidyl methacrylate, and 350 g of diacetone alcohol. An initiator solution was previously prepared by dissolving 2.3 g of 2,2'-azobis(2-methylbutyro-nitrile) as a polymerization initiator in 177.7 g of diacetone alcohol. A 240 g portion of the monomer mix solution and a 54 g portion of the initiator solution were sequentially admitted into the flask, which was heated at 80° C. for 30 minutes, allowing reaction to run. The remainder of the monomer mix solution and the remainder of the initiator solution were concurrently added dropwise at 80-90° C. over 1.5 hours, followed by stirring at 80-90° C. for 5 hours.

The resulting vinyl polymer having organic UV absorptive group and trimethoxysilyl group bonded to side chains had a viscosity of 5,050 mPa·s, and this copolymer contained 15% of the UV absorbing monomer and 20% of the vinyl monomer having a trimethoxysilyl group bonded to a side chain via a C—Si bond. The polymer had a Mw of 60,800 as measured by GPC.

To 100 parts of the resulting vinyl polymer was added 23 parts of colloidal silica dispersed in PGMEA (PMA-ST, Nissan Chemical Industries Co., Ltd., solids concentration 30%, primary particle size 10-15 nm). The mixture was diluted with 110 parts of a solvent mixture of diacetone alcohol and propylene glycol monomethyl ether in a weight ratio 1/1, thoroughly stirred, and filtered through a paper filter, yielding a colorless clear primer composition (P-1) having a nonvolatile concentration of 20.4%.

Preparation of Silicone Coating Composition and Evaluation of Cured Film

Example 1

To 100 parts as solids of the silicone resin solution (B-1) in Synthesis Example 1 was added 40 parts as solids of surface-coated composite zinc oxide nanoparticle dispersion (A-1). Mixing yielded a silicone coating composition #1.

Figure 2:
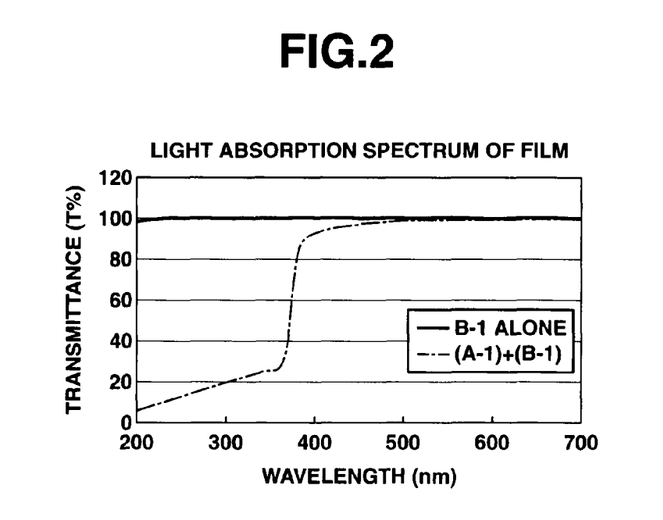
FIG. 2 is a diagram showing UV/visible absorption spectra of the cured films in Example 1.

Composition #1 and silicone resin solution (B-1) alone as comparison were flow coated on quartz substrates and heat cured at 135° C. for 60 minutes to form thin films of about 2.5 μm thick. The thin films were analyzed for light absorption spectrum by a UV/visible spectrophotometer, with the results shown in FIG. 2. It was demonstrated that the cured film of composition #1 absorbed light shorter than 300 nm and was transparent in the visible region.

Examples 2 to 6

Primer composition (P-1) in Synthesis Example 5 was flow coated onto a cleaned surface of a 0.5-mm polycarbonate resin sheet (Iupilon, Mitsubishi Engineering-Plastics Corp.) and heat cured at 135° C. for 45 minutes to form a primer layer of about 6-8 μm thick. Onto the primer layer, a mixture of silicone resin solution (B-1, B-2, B-3) in Synthesis Examples 1 to 3, composite zinc oxide nanoparticle-laden silicone resin solution (AB-1) in Synthesis Example 4, composite zinc oxide nanoparticle dispersion (A-1, A-2), and additives according to the formulation shown in Table 1 was flow coated and heat cured at 135° C. for 60 minutes to form a silicone coating of about 3-5 μm thick. The multilayer coated samples (having primer and silicone layers on PC) were measured for physical properties, with the results shown in Table 1.

Comparative Examples 1 to 5

Coating compositions were prepared by mixing components according to the formulation shown in Table 2. As in Example 2, these coating compositions were coated and cured to the primer layer (P-1 in Synthesis Example 5) on PC sheets. The coated samples were measured for physical properties, with the results shown in Table 2.

It is noted that among the abbreviations shown in Tables 1 and 2, those abbreviations not described in Synthesis Examples have the following meaning.

Additives

F-1: hydrolytic condensate of metal chelate methanol solution of hydrolytic condensate obtained by reacting titanium tetraisopropoxide with acetylacetone, and hydrolyzing with aqueous ammonia, having a solids concentration of 20%

F-2: flexibilizer isopropanol solution of polymethylsilsesquioxane resin (KR-220L, solids 100%, Shin-Etsu Chemical Co., Ltd.) having a solids concentration of 20%

F-3: hindered amine photostabilizer N-acetyl-3-dodecyl-1-(2,2,6,6-tetramethyl-4-piperidinyl)pyrrolidine-2,5-dione (Sandbar 3058Liq, Clariant)

F-4: organic UV absorber 2,4-dihydroxybenzophenone (Chemisorb 10, Chemipro Kasei Kaisha, Ltd.)

F-5: titanium oxide nanoparticle dispersion Optolake 1120Z (11RU-7-A8), solids concentration 20%, JGC Catalysts and Chemicals Ltd.

F-6: zinc oxide nanoparticle dispersion prepared by a technique other than DC arc plasma technique ZS-303-IPA, solids concentration 30%, average particle size (volume average particle size $D_{50}$) 81 nm, Sumitomo Osaka Cement Co., Ltd.

F-7: ZNAP 15 wt %-GO by C.I. Kasei Co., Ltd. dispersion of zinc oxide nanoparticles prepared by DC arc plasma technique in alcohol mixture with the aid of a dispersant, solids concentration 15%, average particle size (volume average particle size $D_{50}$) 89 nm Measurement of Photocatalytic Activity of Zinc Oxide Nanoparticle Dispersion An amount of surface-coated composite zinc oxide nanoparticle dispersion A-1 or A-2, titanium oxide nanoparticle dispersion F-5, or zinc oxide nanoparticle dispersion F-6 or F-7 to provide 0.15 g of oxide nanoparticle solids was added to 20 g of a methylene blue solution in water/methanol (1:1 weight ratio) having a methylene blue concentration of 0.01 mmol/L. The solution was stirred in the dark for 30 minutes, and then irradiated with black light of 15 W for 12 hours. Thereafter, the solution was centrifuged at 3,000 rpm for 15 minutes to collect the supernatant, and the absorbance of methylene blue at 653 nm was measured by a UV/visible spectrophotometer. A photocatalytic degradability (PD) was computed from the absorbances before and after the black light irradiation according to the following formula:

$$PD(\%) = [(A0-A)/A0] \times 100$$

wherein A0 is the initial absorbance and A is the absorbance after the black light irradiation. The results are shown in Table 3.

Tests

Dispersion Stability

The dispersion was allowed to stand at room temperature for one week, after which the dispersed state of surface-coated composite zinc oxide nanoparticles was observed and rated according to the following criterion.

○: well dispersed, no settlement x: agglomerated and settled

Transparency of Cured Film

A film was measured for haze by a haze meter NDH2000 (Nippon Denshoku Industries Co., Ltd.).

Mar Resistance

Mar resistance was analyzed according to ASTM D1044 by mounting a Taber abrasion tester with wheels CS-10F, measuring a haze after 500 turns under a load of 500 g, and calculating a haze difference (ΔHz) before and after the test.

Initial Adhesion

Adhesion was analyzed by a cross-hatch adhesion test according to JIS K5400, specifically by scribing the sample with a razor along 6 longitudinal and 6 transverse lines at a spacing of 2 mm to define 25 square sections, tightly attaching adhesive tape (Cellotape by Nichiban Co., Ltd.) thereto, rapidly pulling back the adhesive tape at an angle of 90°, and counting the number (X) of coating sections kept unpeeled. The result is expressed as X/25.

Appearance and Adhesion after Water Immersion

The sample was immersed in boiling water for 2 hours, after which it was visually observed for appearance and examined for adhesion by the adhesion test.

Weather Resistance

A weathering test was carried out by Eyesuper UV tester W-151 (Iwasaki Electric Co., Ltd.) which operated one cycle of [black panel temperature 63° C., humidity 50% RH, illuminance 50 mW/cm$^2$, raining intervals of 10 sec/hour for 5 hours] and [black panel temperature 30° C., humidity 95% RH for one hour]. The test was continued for 250 hours and 500 hours. A yellowing index (YI) was measured according to JIS K7103 before and after the test, from which a change of yellowing index (ΔYI) was computed. The weathered sample was also examined for cracks and delamination with naked eyes or under a microscope (250× magnifying power).

Crack

The coating appearance after the weathering test was rated according to the following criterion.

○: intact
Δ: some cracks
x: cracks on entire coating

Delamination

The coating after the weathering test was rated according to the following criterion.

○: intact
Δ1: some delamination between silicone coating and primer layer
Δ2: some delamination between primer layer and substrate
x1: overall delamination between silicone coating and primer layer
x2: overall delamination between primer layer and substrate

TABLE 1

Formulation (as solids) of silicone coating composition and tested properties of film

| Formulation (pbw) | | Example | | | | |
|---|---|---|---|---|---|---|
| | | 2 | 3 | 4 | 5 | 6 |
| (Surface coated) composite zinc oxide nanoparticle dispersion | | A-1 26.7 pbw | A-1 6.7 pbw | A-1 14 pbw | A-2 40 pbw | — |
| Silicone resin solution | | B-1 100 pbw | B-2 100 pbw | B-3 100 pbw | B-3 100 pbw | AB-1 100 pbw |
| Additive | | | F-1 1 pbw | F-2 15 pbw | | F-3 1 pbw |
| Test results | Dispersion stability | ○ | ○ | ○ | ○ | ○ |
| | Film transparency Hz | 0.8 | 0.4 | 0.6 | 0.7 | 1.7 |
| | Mar resistance ΔHz | 6.5 | 3.9 | 7.1 | 9.7 | 5.8 |
| | Initial adhesion | 25/25 | 25/25 | 25/25 | 25/25 | 25/25 |
| | Appearance after water immersion | intact | intact | intact | intact | intact |
| | Adhesion after water immersion | 25/25 | 25/25 | 25/25 | 25/25 | 25/25 |
| Weathering test after 250 hr | ΔYI | <1 | <1 | <1 | <1 | <1 |
| | Crack | ○ | ○ | ○ | ○ | ○ |
| | Delamination | ○ | ○ | ○ | ○ | ○ |
| Weathering test after 500 hr | ΔYI | 3 | 5 | 4 | 2 | 3 |
| | Crack | ○ | ○ | ○ | ○ | ○ |
| | Delamination | ○ | ○ | ○ | ○ | ○ |

TABLE 2

Formulation (as solids) of silicone coating composition and tested properties of film

| Formulation (pbw) | | Comparative Example | | | | |
|---|---|---|---|---|---|---|
| | | 1 | 2 | 3 | 4 | 5 |
| (Surface coated) composite zinc oxide nanoparticle dispersion | | | | | | |
| Silicone resin solution | | B-1 100 pbw | B-1 100 pbw | B-2 100 pbw | B-3 100 pbw | B-3 100 pbw |
| Additive | | F-4 5 pbw | F-1 1 pbw F-5 6.7 pbw | F-6 27 pbw | F-7 27 pbw | |
| Test results | Dispersion stability | ○ | ○ | ○ | X | ○ |
| | Film transparency Hz | 0.1 | 0.2 | 0.4 | 4.6 | 0.8 |
| | Mar resistance ΔHz | 3.3 | 10.3 | 7.3 | 7.9 | 10.4 |
| | Initial adhesion | 25/25 | 25/25 | 25/25 | 25/25 | 25/25 |

TABLE 2-continued

Formulation (as solids) of silicone coating composition
and tested properties of film

| Formulation | | Comparative Example | | | | |
|---|---|---|---|---|---|---|
| (pbw) | | 1 | 2 | 3 | 4 | 5 |
| Appearance after water immersion | | intact | intact | intact | intact | intact |
| Adhesion after water immersion | | 25/25 | 25/25 | 25/25 | 25/25 | 25/25 |
| Weathering test after 250 hr | ΔYI | 3 | 1 | <1 | — | 1 |
| | Crack | ○ | ○ | X | — | Δ |
| | Delamination | ○ | ○ | ○ | — | ○ |
| Weathering test after 500 hr | ΔYI | 16 | 9 | — | — | 3 |
| | Crack | X | X | — | — | X |
| | Delamination | X | Δ1 | — | — | ○ |

TABLE 3

Photocatalytic activity of
surface-coated composite zinc oxide nanoparticles

| Surface-coated composite zinc oxide nanoparticle dispersion | Blank | A-1 | A-2 | F-5 | F-6 | F-7 |
|---|---|---|---|---|---|---|
| Initial absorbance @653 nm | 1.275 | — | — | — | — | — |
| Absorbance @653 nm after 12 hr irradiation | — | 0.999 | 1.085 | 0.000 | 0.891 | 0.827 |
| Photocatalytic degradability, % | — | 21.6 | 14.9 | 100 | 30.1 | 35.1 |

Japanese Patent Application No. 2009-047965 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A UV-shielding silicone coating composition comprising (A) a dispersion in a dispersing medium of composite zinc oxide nanoparticles which are zinc oxide nanoparticles surface-coated with at least one member selected from the group consisting of oxides and hydroxides of Al, Zr and Sn, said surface-coated zinc oxide nanoparticles are further surface-treated with at least one member selected from hydrolysable silanes and partial hydrolytic condensates thereof, said hydrolysable silane having the general formula (2):

$$(R^4)_x(R^5)_y Si(X)_{4-x-y} \quad (2)$$

wherein $R^4$ and $R^5$ are each independently hydrogen or a substituted or unsubstituted monovalent hydrocarbon group, X is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3, said zinc oxide nanoparticles from which the composite zinc oxide nanoparticles in dispersion A have been prepared by heating and vaporizing a zinc source in direct current arc plasma, oxidizing the zinc vapor, and cooling, said dispersion having a photocatalytic degradability (PD) of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to the following formula:

PD(%)=[(A0−A)/A0]×100 wherein A0 is the initial absorbance and A is the absorbance after the black light irradiation, (B) a silicone resin is obtained from (co)hydrolytic condensation of at least one member selected from alkoxysilanes having formula (1) and partial hydrolytic condensates thereof, said alkoxysilane having the general formula (1):

$$(R^1)_m(R^2)_n Si(OR^3)_{4-m-n} \quad (1)$$

wherein $R^1$ and $R^2$ are each independently hydrogen or a substituted or unsubstituted monovalent hydrocarbon group, wherein $R^1$ and $R^2$ are optionally bonded together, $R^3$ is a $C_1$-$C_3$ alkyl group, and m and n are independently 0 or 1 and m+n is 0, 1 or 2, in the presence of a dispersion in a dispersing medium of composite zinc oxide nanoparticles which are zinc oxide nanoparticles surface-coated with at least one member selected from the group consisting of oxides and hydroxides of Al, Zr, and Sn, (C) a curing catalyst, and (D) a solvent, the solids content of composite zinc oxide nanoparticle dispersion (A) being 1 to 50% by weight based on the solids content of silicone resin (B).

2. The composition of claim 1, wherein the composite zinc oxide nanoparticles in dispersion (A) have an average particle size (volume average particle size D50) of 10 to 200 nm.

3. The composition of claim 1, wherein the dispersing medium is at least one member selected from the group consisting of water, alcohols, esters, ketones, glycol ethers, aromatic hydrocarbons, and saturated hydrocarbons.

4. A UV-shielding silicone coating composition, comprising:
- a silicone resin,
- a curing agent, and
- a solvent said silicone resin is obtained from (co)hydrolytic condensation of at least one member selected from alkoxysilanes having formula (1) and partial hydrolytic condensates thereof:

$$(R^1)_m(R^2)_n Si(OR^3)_{4-m-n} \qquad (1)$$

wherein $R^1$ and $R^2$ are each independently hydrogen or a substituted or unsubstituted monovalent hydrocarbon group, wherein $R^1$ and $R^2$ are optionally bonded together, $R^3$ is a $C_1$-$C_3$ alkyl group, and m and n are independently 0 or 1 and m+n is 0, 1 or 2, in the presence of a dispersion in a dispersing medium of composite zinc oxide nanoparticles which are zinc oxide nanoparticles surface-coated with at least one member selected from the group consisting of oxides and hydroxides of Al, Zr, and Sn, said surface-coated zinc oxide nanoparticles are further surface-treated with at least one member selected from hydrolysable silanes and partial hydrolytic condensates thereof, said hydrolysable silane having the general formula (2):

$$(R^4)_x(R^5)_y Si(X)_{4-x-y} \qquad (2)$$

wherein $R^4$ and $R^5$ are each independently hydrogen or a substituted or unsubstituted monovalent hydrocarbon group, X is a halogen atom, $C_1$-$C_3$ alkoxy group, $C_1$-$C_3$ acyloxy group or isocyanate group, x is 0 or 1, y is 0, 1 or 2, and x+y is 0, 1, 2 or 3, said zinc oxide nanoparticles from which the composite zinc oxide nanoparticles in dispersion have been prepared by heating and vaporizing a zinc source in direct current arc plasma, oxidizing the zinc vapor, and cooling, said dispersion having a photocatalytic degradability (PD) of up to 25%, wherein the photocatalytic degradability (PD) is determined by adding the dispersion to a methylene blue solution, irradiating black light to the methylene blue solution for 12 hours, measuring the absorbance of the solution at 653 nm before and after the black light irradiation, and calculating according to the following formula:

$$PD(\%)=[(A0-A)/A0]\times 100$$

wherein A0 is the initial absorbance and A is the absorbance after the black light irradiation, the solids content of composite zinc oxide nanoparticle dispersion being 1 to 50% by weight based on the solids content of silicone resin.

5. The composition of claim 1, wherein component (C) is present in an effective amount to cure the silicone resin (B), and component (D) is present in such an amount that the composition has a solids concentration of 1 to 30% by weight.

6. The composition of claim 1, further comprising (E) colloidal silica.

7. The composition of claim 6, wherein the colloidal silica (E) is present in an amount of 5 to 100 parts by weight per 100 parts by weight as solids of the silicone resin (B).

8. The composition of claim 1, further comprising a UV absorber, UV stabilizer, and combinations thereof.

9. The composition of claim 1, wherein when the composition is coated on the surface of a vinyl copolymer layer on an organic resin substrate and cured to form a film, the film does not develop cracks in a weathering test using a Super-UV tester over 500 hours.

10. A coated article comprising a substrate and a cured film of the UV-shielding silicone coating composition of claim 1 disposed on at least one surface of the substrate directly or via at least one layer.

11. The coated article of claim 10 wherein the substrate is an organic resin substrate.

12. A coated article comprising an organic resin substrate, a primer film on at least one surface of the substrate, the primer film comprising a vinyl copolymer having an organic UV absorbing group and an alkoxysilyl group on side chains, and a cured film of the UV-shielding silicone coating composition of claim 1 on the surface of the primer film.

13. A coated article comprising an organic resin substrate, a primer film on at least one surface of the substrate, the primer film comprising a vinyl copolymer having an organic UV absorbing group and an alkoxysilyl group on side chains and a silica sol, and a cured film of the UV-shielding silicone coating composition of claim 1 on the surface of the primer film.

14. A coated article comprising a substrate and a cured film of the UV-shielding silicone coating composition of claim 4 disposed on at least one surface of the substrate directly or via at least one layer.

15. The coated article of claim 14 wherein the substrate is an organic resin substrate.

16. A coated article comprising an organic resin substrate, a primer film on at least one surface of the substrate, the primer film comprising a vinyl copolymer having an organic UV absorbing group and an alkoxysilyl group on side chains, and a cured film of the UV-shielding silicone coating composition of claim 4 on the surface of the primer film.

17. A coated article comprising an organic resin substrate, a primer film on at least one surface of the substrate, the primer film comprising a vinyl copolymer having an organic UV absorbing group and an alkoxysilyl group on side chains and a silica sol, and a cured film of the UV-shielding silicone coating composition of claim 4 on the surface of the primer film.

18. The composition of claim 4, wherein the composite zinc oxide nanoparticles in dispersion have an average particle size (volume average particle size 050) of 10 to 200 nm.

\* \* \* \* \*